United States Patent
Zotov et al.

(10) Patent No.: US 10,458,839 B1
(45) Date of Patent: Oct. 29, 2019

(54) METHODS AND SYSTEMS FOR MONITORING A DYNAMIC SYSTEM

(71) Applicant: General Electric Company, Schenectady, NY (US)

(72) Inventors: Sergey Alexandrovich Zotov, Glenville, NY (US); Todd Frederick Miller, Mechanicville, NY (US)

(73) Assignee: General Electric Company, Schenectady, NY (US)

( * ) Notice: Subject to any disclaimer, the term of this patent is extended or adjusted under 35 U.S.C. 154(b) by 906 days.

(21) Appl. No.: 14/932,477

(22) Filed: Nov. 4, 2015

(51) Int. Cl.
*G01H 1/00* (2006.01)

(52) U.S. Cl.
CPC .................. *G01H 1/003* (2013.01)

(58) Field of Classification Search
CPC ..................................... G01H 1/003
USPC ................................................ 702/33
See application file for complete search history.

(56) References Cited

U.S. PATENT DOCUMENTS

| | | | |
|---|---|---|---|
| 7,495,462 B2 | 2/2009 | Hua et al. | |
| 7,569,411 B2 | 8/2009 | MacDonald et al. | |
| 8,186,218 B2 | 5/2012 | Nozawa | |
| 8,220,330 B2 | 7/2012 | Miller et al. | |
| 8,508,039 B1 | 8/2013 | Nasiri et al. | |
| 8,816,492 B1 | 8/2014 | Minervini | |
| 2006/0111101 A1* | 5/2006 | Chien | H04W 24/00 455/423 |
| 2010/0127715 A1 | 5/2010 | Jeong et al. | |
| 2014/0208823 A1 | 7/2014 | Trusov et al. | |
| 2014/0372802 A1* | 12/2014 | Rao | G06F 11/079 714/37 |

OTHER PUBLICATIONS

Kranz, M. et al.; A Wide Dynamic Range Silicon-On-Insulator MEMS Gyroscope with Digital Force Feedback; The 12th International Conference on Solid State Sensors, Actuators and Microsystems, Boston, Jun. 8-12, 2003; pp. 159-162.

* cited by examiner

*Primary Examiner* — Michael P Nghiem
*Assistant Examiner* — Dacthang P Ngo
(74) *Attorney, Agent, or Firm* — Armstrong Teasdale LLP (57) ABSTRACT

A method for monitoring a dynamic system includes generating system measurement data substantially representative of at least one measured attribute of a plurality of attributes of a dynamic system using at least one measurement device and generating a Poincare map based on the system measurement data. The Poincare map includes representations of the plurality of attributes of the dynamic system. The method also includes determining at least one value for a first attribute of the plurality of attributes of the dynamic system based on the generated Poincare map and regulating real-time operation of the dynamic system based at least partially on the at least one determined value of the first attribute.

22 Claims, 9 Drawing Sheets

METHODS AND SYSTEMS FOR MONITORING A DYNAMIC SYSTEM

BACKGROUND

The field relates generally to monitoring a dynamic system, and more specifically, to methods and systems for using environmentally immune modulation for precise measurement of multiple attributes of a dynamic system.

Resonant sensors, such as gyroscopes, accelerometers, pressure sensors, measure dynamic systems, such as turbines. The dynamic systems include many different attributes. Some of the attributes are system attributes, i.e., attributes that are directly affected by the operation of the dynamic system itself. Other attributes are environmental attributes, i.e., attributes that are affected by the environment of the dynamic system. For example, on a turbine, system attributes may include revolutions per minute (RPM), vibration, and internal temperature. Environmental attributes may include external temperature, humidity, and acceleration in the case of a jet turbine. Other attributes are sensor attributes that affect the operation of the resonant sensor. For example, sensor attributes may include, but are not limited to, temperature-factor, stiffness, gap, resistivity, and resonant frequencies.

When using a sensor to measure a system attribute of a dynamic system, the sensor attributes or the environmental attributes may affect the readings of the measured attribute. For example, when measuring angular rotation, the vibration, the external temperature, and the humidity may affect the reading of the sensor, in addition to the actual angular rotation of the dynamic system. Therefore changes to these non-measured attributes may affect the sensor, thereby affecting the sensor output via the internal sensor attributes or readings of the sensor. For example, a raise in the environmental attribute of temperature may change the reading for the measured attributes of angular rotation, even if the angular rotation of the dynamic system has not changed. Many known measuring systems, with only one sensor, are unable to determine how much a change in the measured attribute or changes in the system or environmental attributes produced the current output reading of the measured attribute. Furthermore, the environment of the sensor may affect the calibration of the sensor, with changes in the environment attributes affecting the accuracy of the output of the sensor.

To counteract this effect, some known systems have used multiple sensors to measure multiple of attributes (both system and environmental) of a dynamic system. Then the readings from the multiple attributes are compared to improve the accuracy of the readings of each sensor, through a calibration process. However, this technique is expensive as it requires multiple sensors to measure multiple attributes (both system and environmental). Furthermore, in some dynamic systems or situations, different system and environmental attributes may affect the measured attribute more than others. One of the other disadvantages of the conventional calibration approach is the time required to properly calibrate the device.

BRIEF DESCRIPTION

In one aspect, a method for monitoring a dynamic system is provided. The method includes generating system measurement data substantially representative of at least one measured attribute of a plurality of attributes of a dynamic system using at least one measurement device and generating a Poincare map based on the system measurement data. The Poincare map includes representations of the plurality of attributes of the dynamic system. The method also includes determining at least one value for a first attribute of the plurality of attributes of the dynamic system based on the generated Poincare map and regulating real-time operation of the dynamic system based at least partially on the at least one determined value of the first attribute.

In another aspect, a sensor system for monitoring a dynamic system is provided. The sensor system includes a sensor for measuring at least one attribute of a plurality of attributes of the dynamic system and a phase portrait analysis (PPA) computer device comprising a processor and a memory coupled to said processor. The PPA computer device is in communication with the sensor. The PPA computer device is configured to generate system measurement data substantially representative of at least one measured attribute of the plurality of attributes of a dynamic system using said sensor and generate a Poincare map based on the system measurement data. The Poincare map includes representations of the plurality of attributes of the dynamic system wherein the plurality of attributes affect the sensor. The PPA computer device is also configured to determine at least one value for a first attribute of the plurality of attributes of the dynamic system based on the Poincare map and regulate real-time operation of the dynamic system based at least partially on the at least one determined value.

In yet another aspect, a phase portrait analysis (PPA) computer device for monitoring a dynamic system is provided. The PPA computer device includes a processor in communication with a memory and a sensor. The processor is configured to generate system measurement data substantially representative of at least one measured attribute of a plurality of attributes of a dynamic system using at least one measurement device and generate a Poincare map based on the system measurement data. The Poincare map includes representations of the plurality of attributes of the dynamic system wherein the plurality of attributes affect the sensor. The processor is also configured to determine at least one value for a first attribute of the plurality of attributes of the dynamic system based on the generated Poincare map and regulate real-time operation of the dynamic system based at least partially on the at least one determined value.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The dynamic system monitoring method and systems described herein provide for highly accurate measurements of system attributes of a dynamic system, while being able to account for environmental stimuli that may affect the measured attributes of the dynamic system. Furthermore, the method and systems described herein allow for accurate measurement of the environmental stimuli of the dynamic system without requiring sensors for each potential stimuli. Also, the system and methods described herein are not limited to any single predefined attribute, but may be implemented with any attribute of a dynamic system, where the attribute has at least one degree of freedom. For example, the method and systems described herein may be used with system attributes such as, but not limited to, temperature, pressure, acceleration, angular momentum, angular velocity, displacement, current, voltage, and charge. By accounting for the environmental stimuli of the dynamic system being monitored, the accuracy of the measurements is greatly increased.

Figure 1:
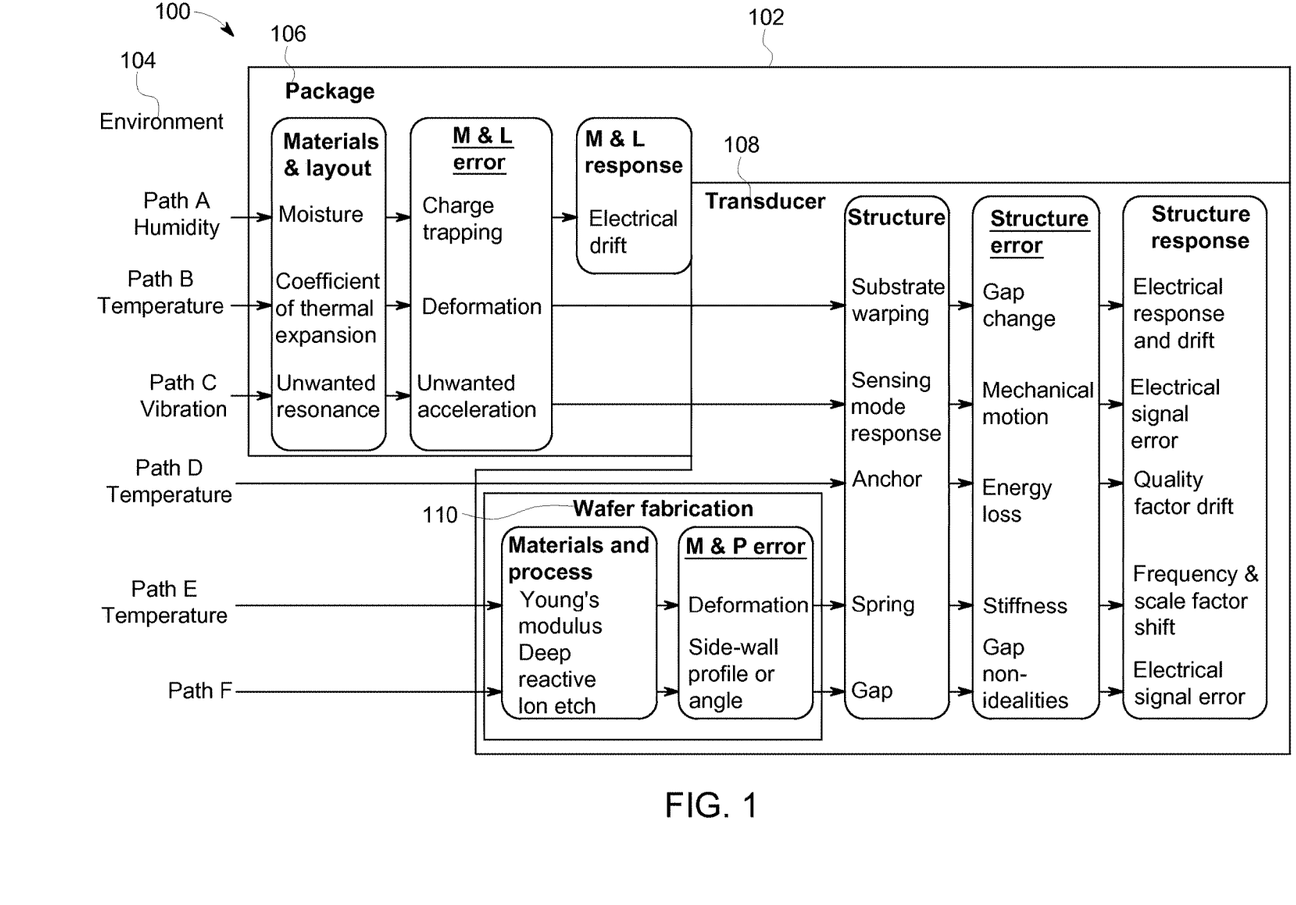
FIG. 1 is a flow chart of exemplary errors that may occur in a sensor system.

FIG. 1 is a flow chart of exemplary errors that may occur in a sensor system 100. As discussed above, environmental stimuli may affect the performance of sensors through changing internal parameters of the sensor, thereby changing the readings of the sensors. For the following examples, a sensor 102 is in environment 104. Sensor 102 includes a package 106, which is the housing for sensor 102, and a transducer 108, which measures an attribute. Transducer 108 is created through a manufacturing process 110, such as a wafer fabrication process. In the exemplary embodiment, environment 104 causes variation in the functioning of sensor 102. This variation causes drift in the output of sensor 102. For example, following Path A, one stimuli from environment 104 is humidity. Humidity impacts a package 106 of sensor 102. Humidity causes trapped charge or charge transfer between interconnects within sensor 102, which then results in an electrical drift. Electrical drift leads to errors in the output of sensor 102.

Path B shows one set of potential errors due to temperature. Environment 104 (temperature) causes a coefficient of thermal expansion which deforms package 106. The substrate of transducer 108 warps or deforms, thereby creating a change in the gap leading to an electrical shift in the output. In the worst case, the glass transition of package 106 is crossed, which leads to a time dependent relaxation resulting in an electrical response drift of transducer 108.

Path C shows a set of potential errors due to vibration. Environment 104 (vibration) can cause a resonance in package 106 (unintended mechanical mode), which creates an acceleration imparted to transducer 108. If transducer 108 has a structure that responds to that mechanical motion in the same axis or cross-axis, the mechanical motion is an acceleration error signature. The acceleration error signature will combine with the intended acceleration sensitive signal, thereby causing errors in the output of sensor 102.

Path D shows another set of potential errors due to temperature. Environment 104 (temperature) causes energy to be dissipated through the anchor of transducer 108 into the substrate of transducer 108 and not through the sensing proof mass as intended. This results in a drift of the quality factor of transducer 108, thereby changing the output of sensor 102.

Path E shows yet another set of potential errors due to temperature. Environment 104 (temperature) changes the Young's Modulus, the linear elastic property, of the transducer 108. In this situation, transducer 108 includes a spring and a proof mass. The temperature changes create a deformation in the material of the spring. This changes the stiffness of the spring, which results in a change in the frequency response and a shift in the scale factor output of transducer 108. Thereby, reducing the accuracy of sensor 102.

Path F shows errors based on a manufacturing defect. Creating a transducer 108 potentially includes many steps including Deep Reactive Ion Etching (DRIE). Normal process variation in manufacturing process 110 using DRIE can create imperfections in the side wall profile. Manufacturing process 110 can also result in the etch being formed at angle from the top of the proof mass to the bottom, where the ideal it is perfectly straight. This process variation results in variations of the drive or sense gap, resulting in electrical deviations, thereby changing the output of sensor 102.

The above examples are just a sampling of potential errors that may occur with sensor system 100. Ones skilled in the art would know additional errors that could occur to affect the accuracy or readings of sensor systems 100.

Figure 2:
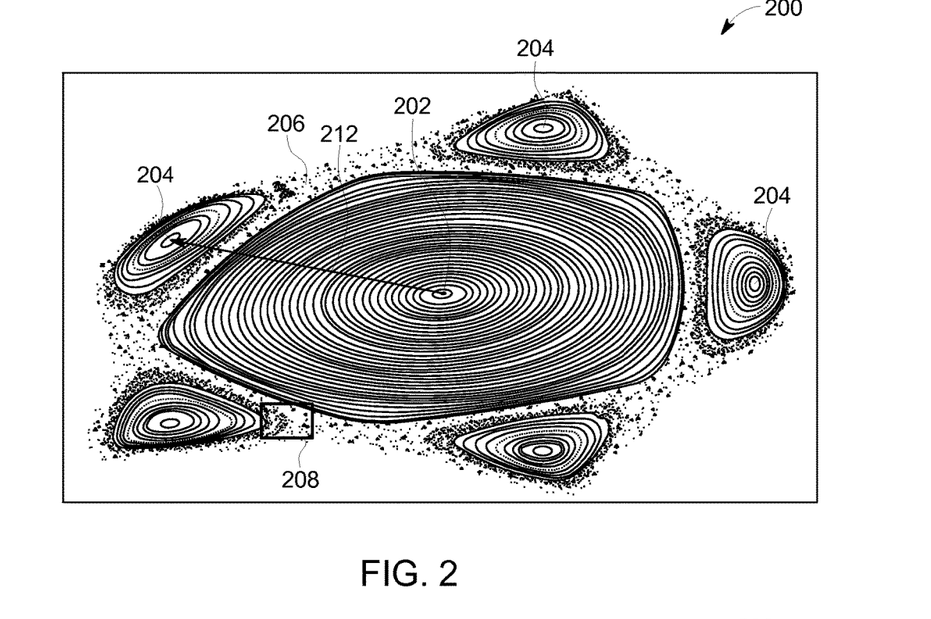
FIG. 2 is a representation of an exemplary Poincare map of a dynamic system with at least one degree of freedom.

FIG. 2 displays a representation of a Poincare map 200 of a dynamic system with at least one degree of freedom. Poincare map 200 is a 2-dimensional (2D) representation of a cross-section of a 4-dimensional (4D) phase portrait, where a phase portrait is a geometric representation of the trajectories of a dynamic system in the phase plane. The phase plane is a 2D representation of phase space. Phase space is a space in which all possible states of a dynamic system are represented, with each possible state of the dynamic system corresponding to one unique point in the phase space. The phase portrait and Poincare map 200 depict the dynamic system's stable states with dots and the unstable steady states with circles. The x-axis of Poincare map 200 displays values of a measured attribute. The y-axis displays values of the derivative of the measured attribute.

The phase portrait, and thus Poincare map 200, is generated based on the outputs of a sensor measuring a system attribute (known as the measured attribute) of the dynamic system. In a first embodiment, the sensor associated with Poincare map 200 measures angular momentum. In the first embodiment, the x-axis represents the angular velocity and the y-axis represents the derivative of the angular velocity. In a second embodiment, the sensor associated with Poincare map 200 measures RPM. In other embodiments, the sensor could measure other system attributes of the dynamic system, for example, but not limited to velocity, displacement, current, voltage, charge, fluid temperature, pressure, or any other system attribute of the dynamic system. Poincare map 200 also includes a center point 202. Poincare map also includes a plurality of large perturbations 204 (also known as large islands for the purposes of this disclosure) that surround center point 202. Surrounding large islands 204 are perturbation zones, such as perturbation zone 206.

Figure 3:
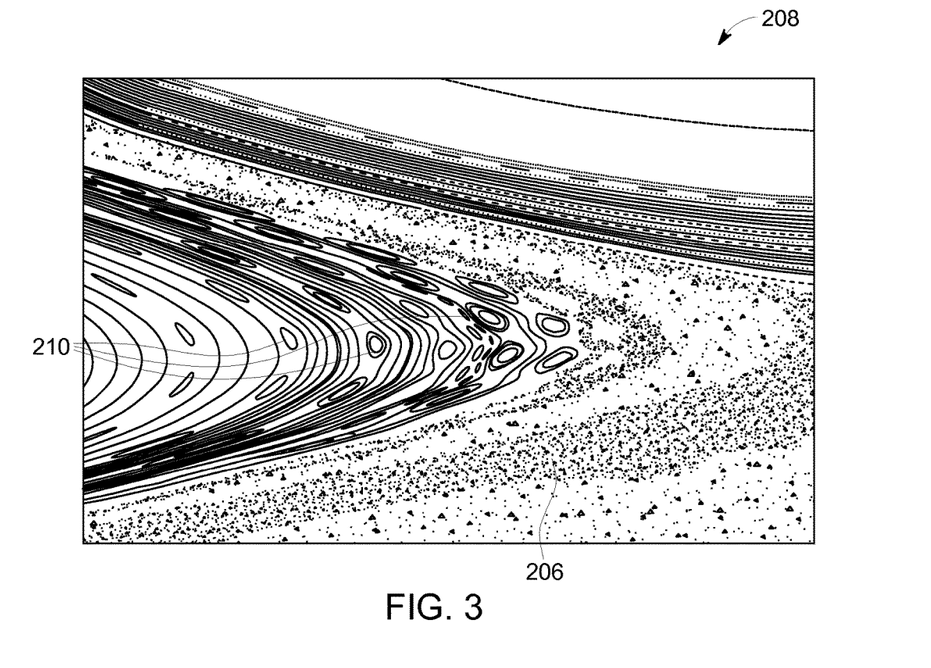
FIG. 3 is a magnified view of an exemplary perturbation zone taken along area 2 of the Poincare map shown in FIG. 2.

FIG. 3 is a magnified view of an exemplary perturbation zone 206 taken along area 208 of the Poincare map 200 (all shown in FIG. 2). Perturbation zone 206 includes a plurality of small perturbations 210 (also known as small islands). The plurality of large islands 204 (shown in FIG. 2) depicts the measured attribute of the sensor, while the small islands depict environmental stimuli or attributes of the dynamic system. In the exemplary embodiment, values for the environmental stimuli, such as temperature, acceleration of a vehicle associated with the dynamic system, and vibration, are represented by small islands 210. Large islands 204 have a volume greater than the small islands 210 by at least one order of magnitude.

Referring to FIG. 2, vector 212 illustrates the difference between center point 202 and one of the large islands 204. In some embodiments, vector 212 could be used to measure the distance between center point 202 and each of the large islands 204. In some of these embodiments, vector 212 is used to measure the absolute distance. In other embodiments, vector 212 is used to measure the distance based on one of the axes of Poincare map 200. In still other embodiments, at least one of the size, the shape, and the volume of large islands 204 is used to determine the value of the measured attribute. Each of the coordinates is inserted into an equation to derive the measured attribute (i.e., angular momentum). In further embodiments, the size, the shape, and the volume of large islands 204 can be used to determine values for environmental stimuli.

Figure 4:
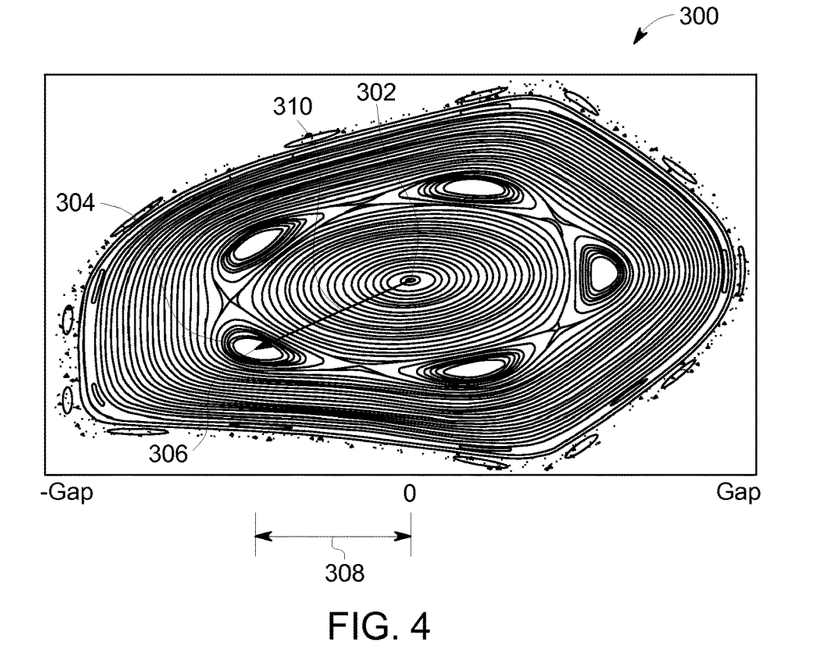
FIG. 4 illustrates a version of the Poincare map, shown in FIG. 2, of the dynamic system where the exemplary measured attribute has a value of 200 RPM.
Figure 5:
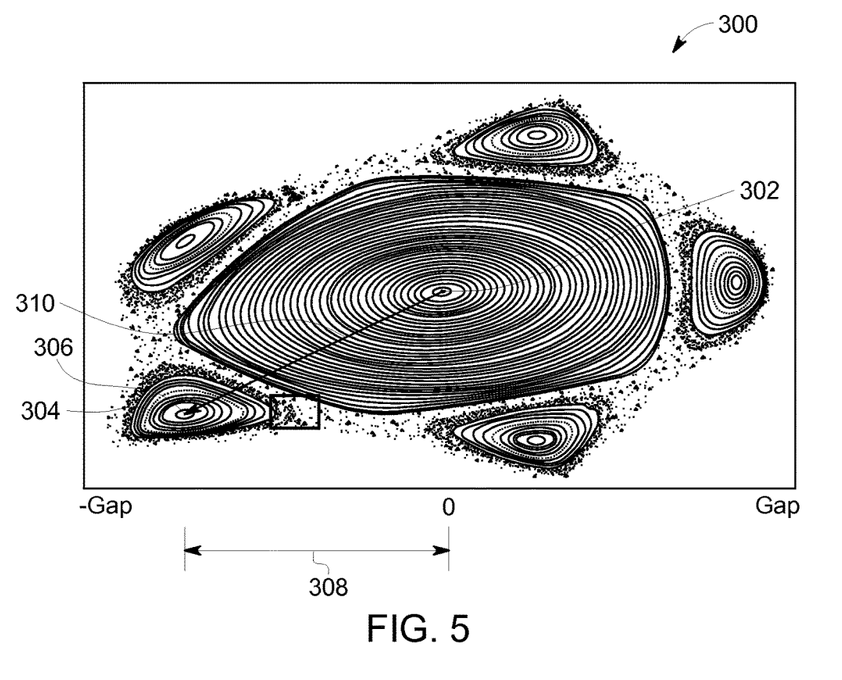
FIG. 5 illustrates a version of the Poincare map, shown in FIG. 2, of the dynamic system where the exemplary measured attribute has a value of 1000 RPM.

FIGS. 4 and 5 illustrate Poincare maps 300 of the dynamic system at different values of the measured attribute. FIG. 4 illustrates a version of the Poincare map 200, shown in FIG. 2, of the dynamic system where the exemplary measured attribute has a value of 200 deg/s angular velocity. FIG. 5 illustrates a version of the Poincare map 200 of the dynamic system where the exemplary measured attribute has a value of 1000 deg/s.

In FIG. 4, vector 310 as applied to the x-axis measures the distance between center point 302 and center 306 of large island 304 as 30% of the total gap. The total gap is the distance from center point 304 to the end of Poincare map 200, where the gap is measured along the x-axis. Gap 308 in FIG. 4 shows that the distance is 30% of the total gap. The 30% illustrated in FIG. 4 is derived by measuring the distance between center point 302 and center 306 of large island 304 along the x-axis.

In FIG. 5, vector 310 as applied to the x-axis measures the distance between center point 302 and center 306 of large island 304 as 75% of the total gap. Gap 308 in FIG. 5 shows that the distance is 75% of the total gap. The 75% illustrated in FIG. 5 is derived by measuring the distance between center point 302 and center 306 of large island 304 along the x-axis. Accordingly, as gap 308 between center point 302 and center 306 of the large islands 304 are representative of the value of the measured attribute, gap 308 may be used to reliably determine a value of the measured attribute.

Figure 6:
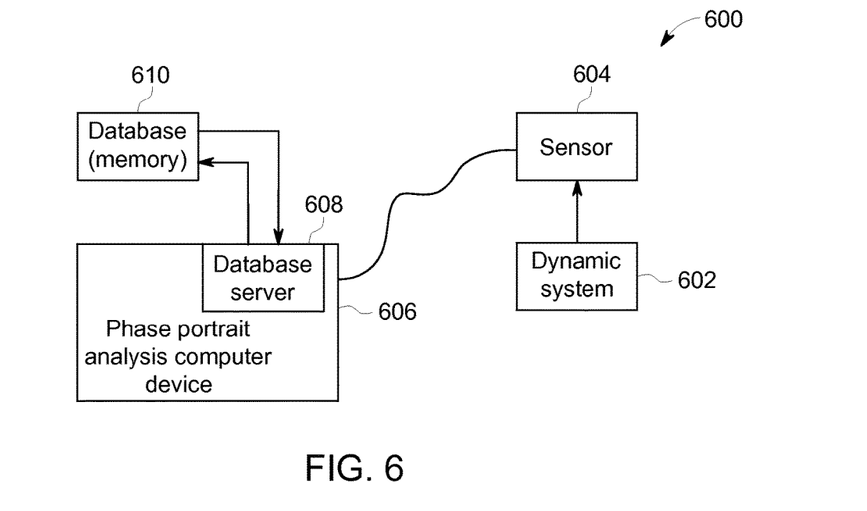
FIG. 6 is a schematic view of an exemplary measurement system for measuring attributes of the dynamic system associated with the Poincare map of FIG. 2.

FIG. 6 is an exemplary schematic view of a measuring system 600 for measuring system attributes of a dynamic system 602 associated with Poincare map 200 (shown in FIG. 2). In the exemplary embodiment, measuring system 600 is used for compiling data from at least one sensor 604 and determining values for the measured attribute of dynamic system 602 and environmental stimuli 603. Sensor 604 may be similar to sensor 102 shown in FIG. 1 and dynamic system 602 may be similar to sensor system 100 shown in FIG. 1. Examples of dynamic system 602 include, but are not limited to, inertial navigation systems, turbines, windmills, and oil and gas downhole systems.

Sensor 604 (also known as a High-Q resonator) observes dynamic system 602 over time. More specifically, sensor 604 measures a measured attribute 605 of dynamic system 602 and is in communication with a phase portrait analysis (PPA) computer device 606. Sensor 604 connects to PPA computer device 606 through various wired or wireless interfaces including without limitation a network, such as a local area network (LAN) or a wide area network (WAN), dial-in-connections, cable modems, Internet connection, wireless, and special high-speed Integrated Services Digital Network (ISDN) lines. Sensor 604 receives data about conditions of dynamic system 602 and reports those conditions to PPA computer device 606.

In the exemplary embodiment, sensor 604 includes a High-Q resonator (also known as an energy low-dissipation resonator) that facilitates multiple-harmonic excitation to allow the system to operate as described herein. Q stands for quality factor (also known as Q factor). Q factor is a dimensionless parameter that describes how under-damped an oscillator or resonator is. A higher Q indicates a lower rate of energy loss relative to the stored energy of the resonator as the oscillations die out more slowly. A pendulum suspended from a high-quality bearing, oscillating in air, has a high Q, while a pendulum immersed in oil has a low one. Resonators with high quality factors have low damping so that they resonate longer. In one embodiment, the high-Q resonator has a Q factor of about 90 or greater. In the exemplary embodiment, the high-Q resonator has a Q factor of about million. The higher the Q factor the greater the resolution or performance.

Examples of high Q resonators include, but are not limited to, an optical resonator, a mechanical resonator, an electrical resonator, and an acoustic resonator, where the resonator is capable of detecting multiple harmonics. These harmonics further represent the measured attribute 605. In the exemplary embodiment, there are up to 20 harmonics that could be represented in the following equation:

$$\sum_{n=1}^{20} A_n \sin(n\omega t) \qquad \text{Eq. 1}$$

where ω is the measured attribute 605, n is the harmonic number, t is time from t=0, $A_n$ is a constant.

Sensor 604 is also affected by environmental stimuli 603 and internal sensor attributes, such as the Q factor. For example, in one embodiment, sensor 604 includes a spring and measures displacement. As force is applied to sensor 604, sensor 604 measures the displacement and transmits a signal representing that displacement to PPA computer device 604. In this embodiment, the Q factor is based on the tension of the spring and the Q factor of the spring is affected by the environmental temperature. In this example, the effect of temperature on the Q factor of the spring is known, so as the Q factor changes, the temperature can be determined.

In some embodiments, sensor 604 includes a High-Q resonator, while in other embodiments, sensor 604 is the High-Q resonator. The High-Q resonator is situated so that environmental stimuli 603 affect the values of measured attribute 605 that sensor 604 reports.

Sensor 604 outputs data 607 to PPA computer device 606. In the exemplary embodiment, sensor 604 outputs data 607 as an electrical signal representative of the measured attribute of dynamic system 602. For example, sensor 604 transmits an analog signal 607 that varies between 4 mA and 20 mA, where 4 mA represents a minimum expected value for the measured attribute and 20 mA represents a maximum expected value for the measured attribute. In some embodiments, measuring system 600 includes a plurality of sensors 604. In some embodiments, the plurality of sensors 604 each observe the same system attribute 605, while in other embodiments the plurality of sensor 604 observe different system attributes.

A database server 608 is coupled to a database 610, which contains information on a variety of matters, as described below in greater detail. In one embodiment, database 610 is centralized and stored on PPA computer device 606. In an alternative embodiment, database 610 is stored remotely from PPA computer device 606 and is non-centralized. In some embodiments, database 610 includes a single database having separated sections or partitions. In other embodiments, database 610 includes multiple databases, each being separate from each other. Database 610 stores data received from sensor 604. In addition, database 610 stores historical data and equations as part of collecting data 607 from sensor 604.

In some embodiments, PPA computer device 606 is in communication with a client system (not shown). PPA computer device 606 connects to client system through various wired or wireless interfaces including without limitation a network, such as a local area network (LAN) or a wide area network (WAN), dial-in-connections, cable modems, Internet connection, wireless, and special high-speed Integrated Services Digital Network (ISDN) lines. PPA computer device 606 transmits data about the operation of dynamic system 602 to the client system. In one embodiment, this data includes raw data from sensor 604, values 607 of the measured attribute 605 measured by sensor 604, values of environmental stimuli 603 of dynamic system 602, or Poincare map 200 (shown in FIG. 2). Furthermore, PPA computer device 606 is capable of receiving additional information from the client system. Additionally, the client system is capable of accessing database 610 through PPA computer device 606. The client system presents the data measured by sensor 604 to a user (not shown in FIG. 6). In other embodiments, PPA computer device 606 includes a display unit (not shown) to display data directly to the user.

In the exemplary embodiment, PPA computer device 606 detects variation in the output of sensor 604. In some embodiments, PPA computer device 606 corrects for the error before outputting the values of the measured attribute. In other embodiments, PPA computer device 606 detects the variations and alerts a user to a potential issue with sensor 604. In some of these embodiments, the user then replaces or repairs sensor 604. In other of these embodiments, the user may become aware of an attribute of dynamic system 602 and then correct the issue with the attribute. For example, PPA computer device 606 warns the user that the temperature in the dynamic system has increase and is causing variations in sensor 604. The user then determines the cause of the temperature variation and corrects it. In a second example, PPA computer device 606 detects a vibration in dynamic system 602. The user then corrects the cause of the vibration.

Figure 7:
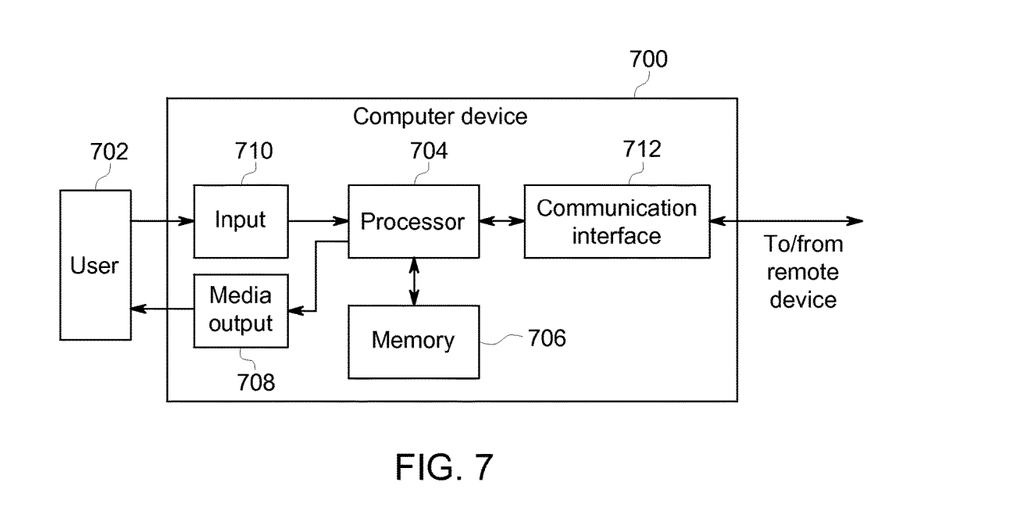
FIG. 7 is a schematic view of an exemplary configuration of a computer device that may be used to measure attributes of a dynamic system used with the measurement system shown in FIG. 6.

FIG. 7 is a schematic view of an exemplary configuration of a computer device 700 that may be used to measure attributes of dynamic system 602 used with the measuring system 600 (shown in FIG. 6). Computer device 700 is operated by a user 702. Computer device 700 may include, but is not limited to, PPA computer device 606 (shown in FIG. 6). Computer device 700 includes a processor 704 for executing instructions. In some embodiments, executable instructions are stored in a memory area 706. Processor 704 may include one or more processing units (e.g., in a multi-core configuration). Memory area 706 is any device allowing information such as executable instructions and/or transaction data to be stored and retrieved. Memory area 706 includes one or more computer readable media. In some embodiments, memory area 706 includes database 610 (shown in FIG. 6). In some embodiments, memory area 706 is stored in computer device 700. In alternative embodiments, memory area 706 is stored remotely from computer device 700.

Computer device 700 also includes at least one media output component 708 for presenting information to user 702. Media output component 708 is any component capable of conveying information to user 702. In some embodiments, media output component 708 includes an output adapter (not shown) such as a video adapter and/or an audio adapter. An output adapter is operatively coupled to processor 704 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 708 is configured to present a graphical user interface (e.g., a web browser and/or a client application) to user 702. A graphical user interface may include, for example, an online store interface for viewing and/or purchasing items, and/or a wallet application for managing payment information. In some embodiments, computer device 700 includes an input device 710 for receiving input from user 702. User 702 may use input device 710 to, without limitation, select a measured attribute to view. Input device 710 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 708 and input device 710.

Computer device 700 may also include a communication interface 712, communicatively coupled to a remote device such as sensor 604 (shown in FIG. 6). Communication interface 712 may include, for example, a wired or wireless network adapter and/or a wireless data transceiver for use with a mobile telecommunications network.

Stored in memory area 706 are, for example, computer readable instructions for providing a user interface to user 702 via media output component 708 and, optionally, receiving and processing input from input device 710. A user interface may include, among other possibilities, a web browser and/or a client application. Web browsers enable users, such as user 702, to display and interact with media and other information typically embedded on a web page or a website from PPA computer device 606. A client application allows user 702 to interact with, for example, PPA computer device 606. For example, instructions may be stored by a cloud service, and the output of the execution of the instructions sent to the media output component 708.

Processor 704 executes computer-executable instructions for implementing aspects of the disclosure. In some embodiments, processor 704 is transformed into a special purpose microprocessor by executing computer-executable instructions or by otherwise being programmed. For example, processor 704 is programmed with instructions discussed further below.

Figure 8:
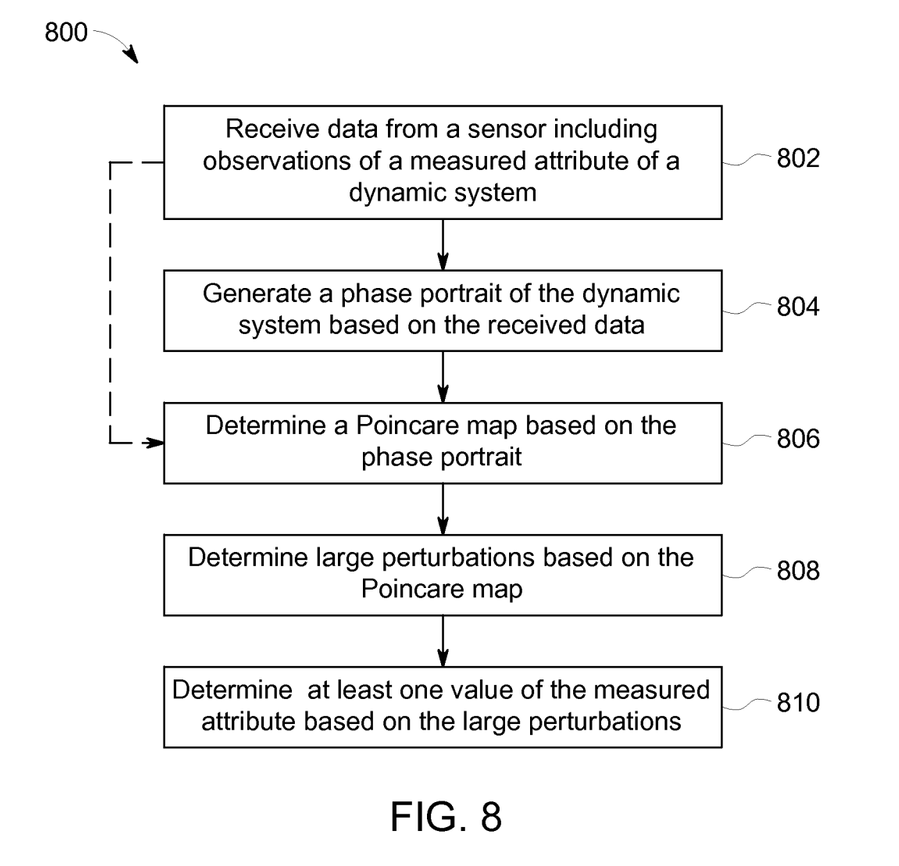
FIG. 8 is a flow chart of an exemplary process of measuring a measured attribute of the dynamic system using the measurement system shown in FIG. 6.

FIG. 8 is a flow chart of an exemplary process 800 of determining at least one value of a measured attribute 605 of dynamic system 602 using the measuring system 600 (shown in FIG. 6). In the exemplary embodiment, process 800 is performed by PPA computer device 606 (shown in FIG. 6).

In the exemplary embodiment, PPA computer device 606 receives 802 data 607 (shown in FIG. 6) from one or more sensor 604 (shown in FIG. 6). Sensor data 607 includes observations of a dynamic system 602 where the resonator of sensor 604 has been excited by multiple harmonics. The sensor data further includes information about observed values of a measured attribute 605 of dynamic system 602. Sensor data 607 also includes the effects of environmental stimuli 603 (shown in FIG. 6) on dynamic system 602. In the exemplary embodiment, sensor data 607 is received as electrical signals representative of measured attribute 605 of dynamic system 602. In other embodiments, the sensor data may be digital log files of values.

PPA computer device 606 generates 804 a phase portrait based on received sensor data 607. In the exemplary embodiment, the phase portrait is a 3D representation of sensor data 607. PPA computer device 606 determines 806 a 2D cross-section of the 3D phase portrait (i.e., the Poincare map 200 shown in FIG. 2). In some embodiments, PPA computer device 606 determines 806 a Poincare map 200 without generating 804 a phase portrait. In the exemplary embodiment, PPA computer device 606 determines 806 Poincare map 200 based on the received signals from sensor 604. PPA computer device 606 plots the signals on a 2D Poincare map 200, where the x-axis the represents the values 607 of measured attribute 605 and the y-axis represents the derivative of measured attribute 605. PPA computer device 606 continues to plot the signals on Poincare map 200 on a periodic basis, where the periodic basis is based on one of the multiple harmonics that sensor 604 monitors. In the exemplary embodiment, the chosen harmonic is the first harmonic; however, ones skilled in the art would realize that other harmonics would work as well. In some embodiments, these periodic updates occur at predefined periods of time, i.e., every 5 seconds. In other embodiments, the periodic updates may occur when requested by PPA computer device 606. PPA computer device 606 determines 808 a plurality of large islands 204 (large perturbations) (shown in FIG. 2) from Poincare map 200. In some embodiments, sensor 604 provides data periodically, in real-time, where PPA computer device 606 updates Poincare map 200 in real-time based on the updated data.

PPA computer device 606 determines 810 at least one value of measured attribute 605 based on the large islands 204 (shown in FIG. 2). In the exemplary embodiment, PPA computer device 606 measures a gap 310 between each of the large islands 304 and center point 304 (all shown in FIG. 3A). In other embodiments, PPA computer device 606 measures the shape or the volume of the large islands 204 to determine the at least one value of measured attribute 605. PPA computer device 606 is able to receive updates in real-time to allow for real-time output of the measured attribute.

Figure 9:
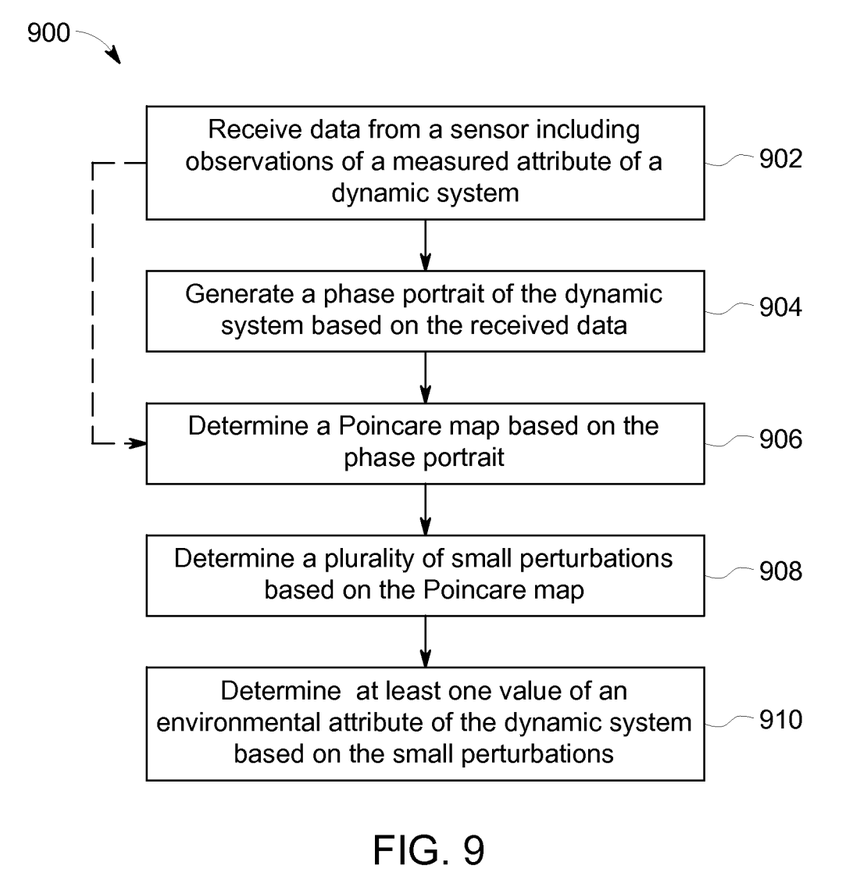
FIG. 9 is a flow chart of an exemplary process of measuring an environmental attributes of the dynamic system using the measurement system shown in FIG. 6.

FIG. 9 is a flow chart of an exemplary process 900 of measuring an environmental attributes of dynamic system 602 using the measuring system 600 (shown in FIG. 6). In the exemplary embodiment, process 900 is performed by PPA computer device 606 (shown in FIG. 6).

In the exemplary embodiment, PPA computer device 606 receives 902 data 607 from one or more sensor 604 (shown in FIG. 6). Sensor data 607 includes observations of dynamic system 602. Sensor data 607 further includes information about observed values of a measured attribute 605 of dynamic system 602. Sensor data 607 also includes the effects of environmental stimuli 603 (shown in FIG. 2) and internal parameters on dynamic system 602.

PPA computer device 606 generates 904 a phase portrait based on received sensor data 607. In the exemplary embodiment, the phase portrait is a 3D representation of sensor data 607. As described above, PPA computer device 606 determines 906 a 2D cross-section of the 3D phase portrait (the Poincare map 200 shown in FIG. 2). In some embodiments, PPA computer device 606 determines 906 a Poincare map 200 without generating 904 a phase portrait. PPA computer device 606 determines 908 a plurality of small islands 210 (small perturbations) from perturbation zone 206 (both shown in FIG. 2) shown in Poincare map 200. PPA computer device 606 determines 910 at least one value of an environmental stimuli 603 of dynamic system 602 based on the small islands 210. In some embodiments, PPA computer device 606 measures the shape, the position, or the volume of the small islands 210 to determine the at least one value of environmental stimuli 603. In the exemplary embodiment, PPA computer device 606 determines values for multiple different environmental stimuli 603 based on the small islands 210. In some embodiments, PPA computer device 606 measures the shape and size of large islands 204 (shown in FIG. 2) to determine 910 at least one value of an environmental stimuli 603 of dynamic system 602. In some embodiments, PPA computer device 606 determines at least one value of an internal sensor attributes of sensor 604 and the included high Q resonator from large islands 204 and small islands 210. For example, if the effect of temperature on the Q factor of the resonator is known, then by determining the changed temperature, PPA computer device 606 determines the current Q factor.

Figure 10:
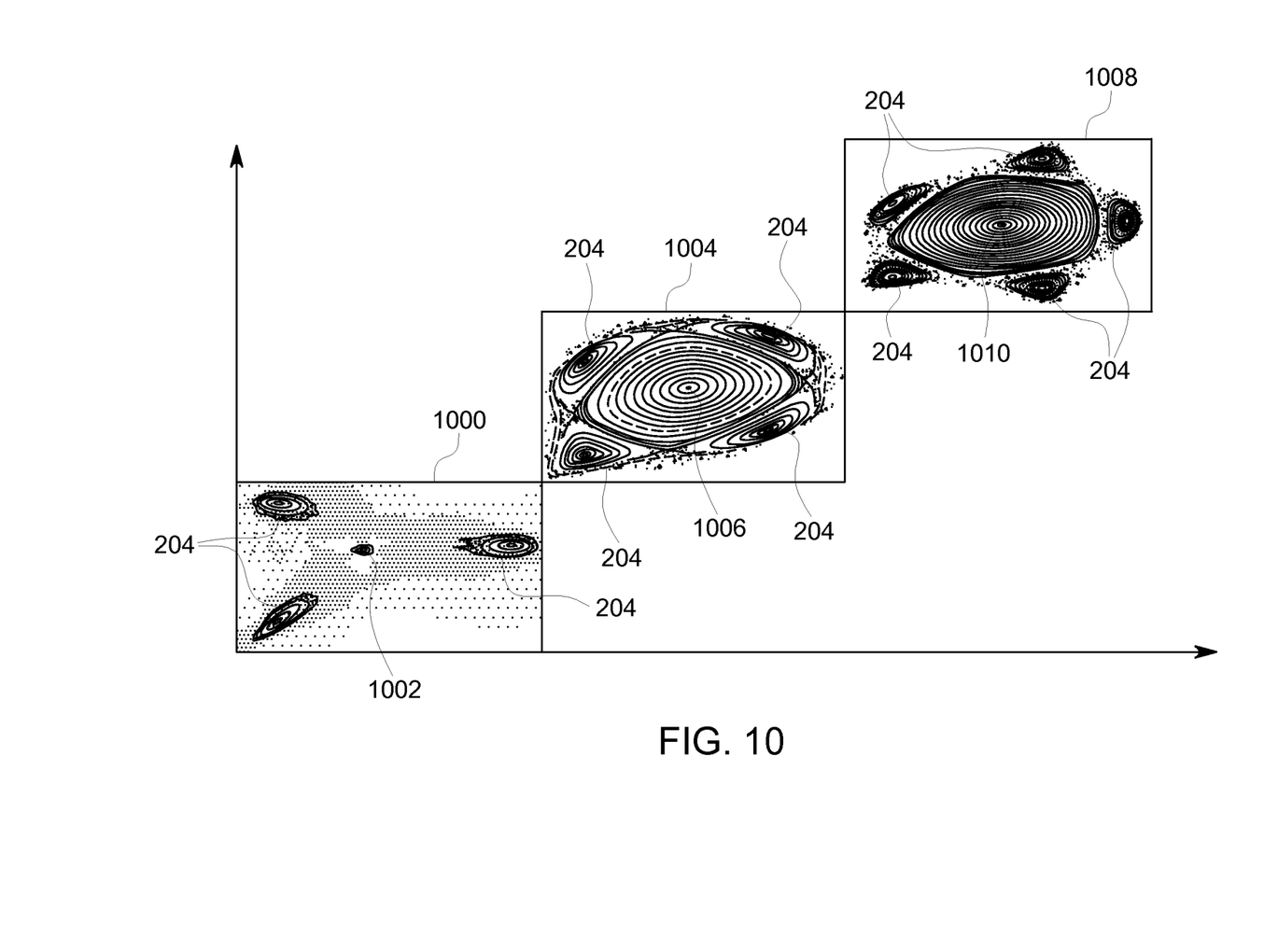
FIG. 10 illustrates additional Poincare maps that may be generated by the measurement system shown in FIG. 6.

FIG. 10 illustrates additional Poincare maps that may be generated by dynamic system 602 (shown in FIG. 6). While Poincare map 200 shows five large islands 204 (both shown in FIG. 2), Poincare maps 1000, 1004, and 1006 demonstrate other configurations and numbers of large islands 204 that are available. Poincare map 1000 shows three large islands 204 surrounding a small center point 1002. Poincare map 1004 illustrates four large islands 204 surrounding center point 1006, while Poincare map 1008 is Poincare map 200 and illustrates five large islands 204 surrounding center point 1010. In other embodiments, other configurations or numbers of large islands are possible and may be used to measure measured attributes and environmental stimuli as described herein.

Figure 11:
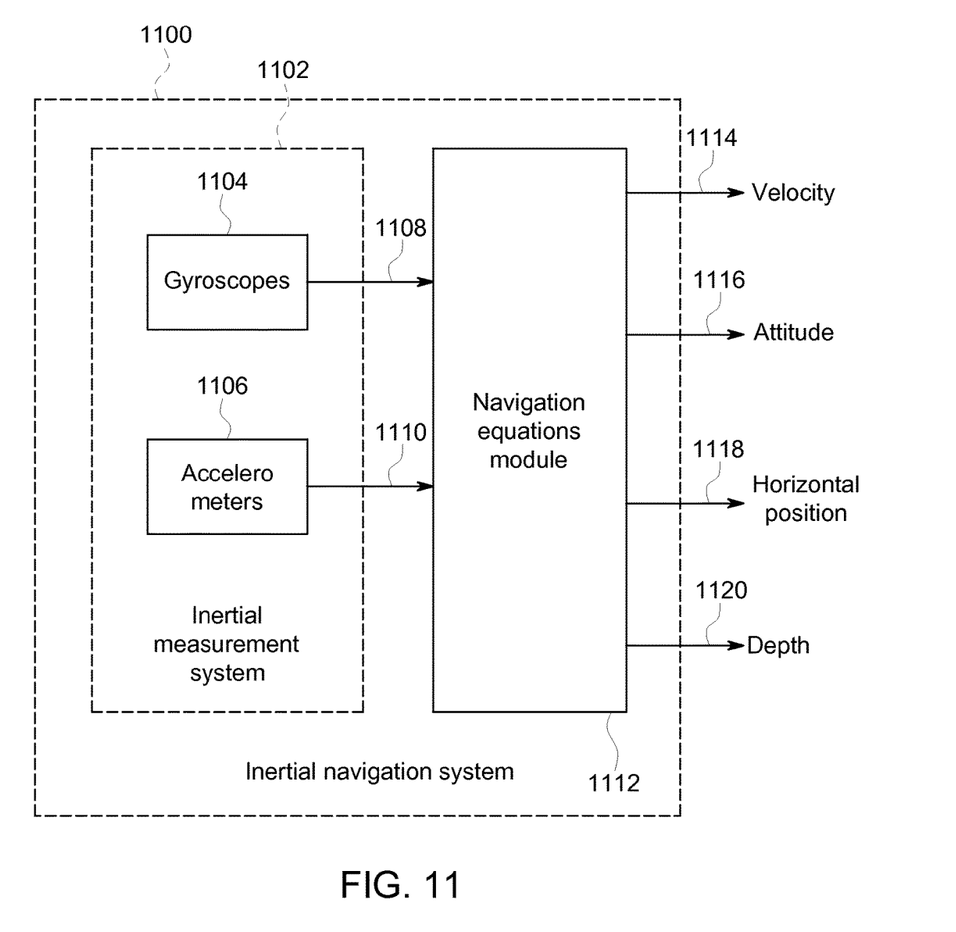
FIG. 11 is a block diagram of an exemplary Inertial Navigation System that may be used with measuring system, shown in FIG. 6.

FIG. 11 is a block diagram of an exemplary Inertial Navigation System (INS) 1100 that may be used with measuring system 600, shown in FIG. 6. In the exemplary embodiment, INS 1100 includes an inertial measurement system 1102. Inertial measurement system 1102 includes gyroscopes 1104 and accelerometers 1106. Gyroscopes 1104 and accelerometers 1106 are similar to sensor 604, shown in FIG. 6. Gyroscope 1104 outputs angular rate 1108. Accelerometer 1106 outputs linear acceleration 1110. In the exemplary INS 1100, a navigation equations module 1112 receives angular rate and acceleration 1108 and force 1110. In the exemplary embodiment, navigation equations module 1112 either includes, or is similar to, PPA computer device 606 (shown in FIG. 6). Based on inputs 1108 and 1110, navigation equations module 1112 calculates velocity 1114, attitude 1116, horizontal position 1118, and depth 1120. In the exemplary embodiment, navigation equations module 1112 detects errors in sensor 604, such as based on drift, and corrects for those errors.

Figure 12:
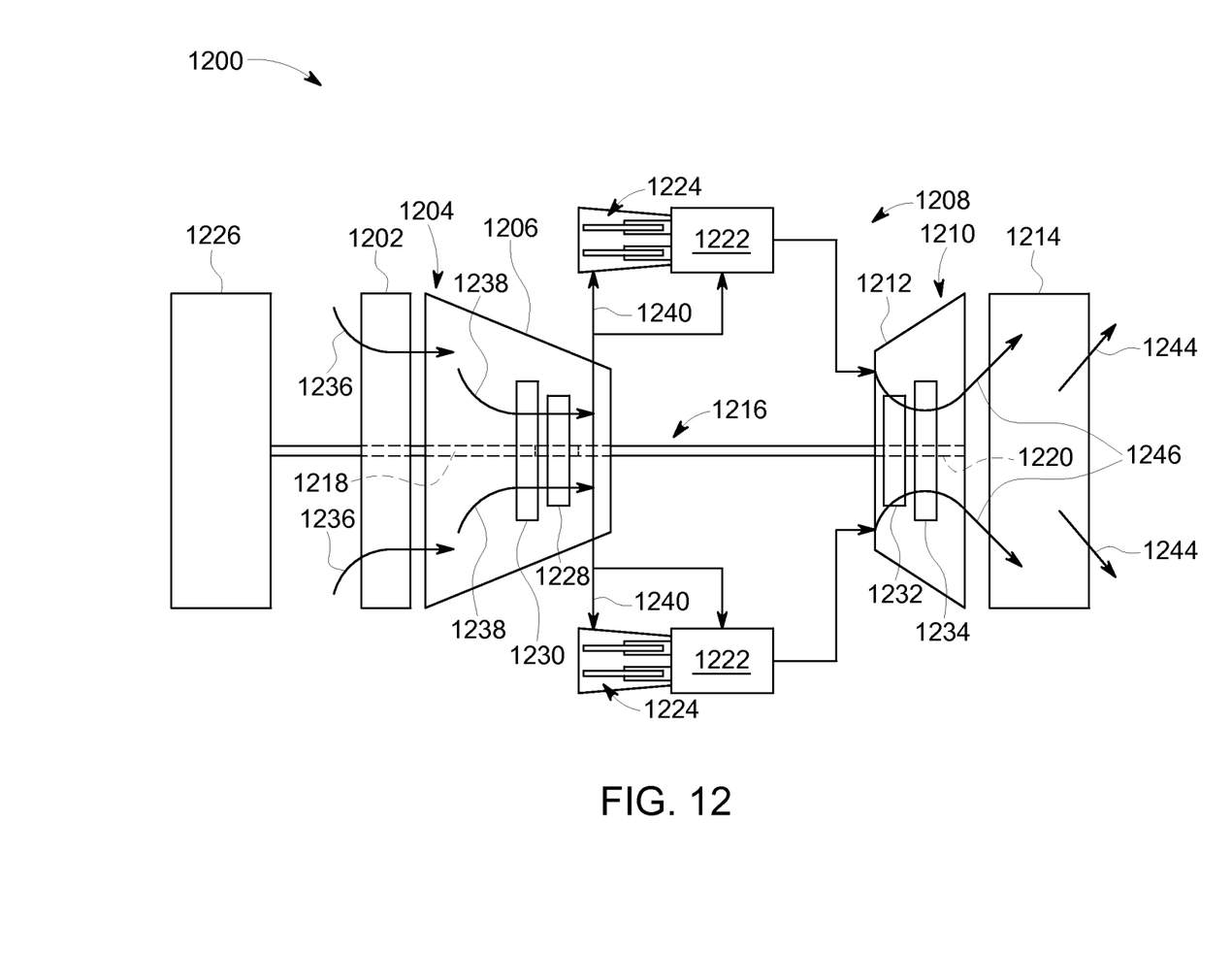
FIG. 12 is a schematic view of a high-temperature asset, i.e., a turbomachine, and more specifically, in the exemplary embodiment, a gas turbine engine that may be used with measuring system, shown in FIG. 6.

FIG. 12 is a schematic view of a high-temperature asset, i.e., a turbomachine, and more specifically, in the exemplary embodiment, a gas turbine engine 1200 that may be used with measuring system 600, shown in FIG. 6. Alternatively, any high-temperature apparatus, system, and facility may be monitored and controlled using a system substantially similar to the measuring system 600 as described herein, including, without limitation, combustion systems such as fossil-fired furnaces, gasification systems, boilers, steam turbines, and the associated high-temperature exhaust systems.

In the exemplary embodiment, gas turbine engine 1200 includes an air intake section 1202, and a compressor section 1204 that is coupled downstream from, and in flow communication with, intake section 1202. Compressor section 1204 is enclosed within a compressor casing 1206. A combustor section 1208 is coupled downstream from, and in flow communication with, compressor section 1204, and a turbine section 1210 is coupled downstream from, and in flow communication with, combustor section 1208. Gas turbine engine 1200 is enclosed within a turbine casing 1212 and includes an exhaust section 1214 that is downstream from turbine section 1210. Moreover, in the exemplary embodiment, turbine section 1210 is coupled to compressor section 1204 via a rotor assembly 1216 that includes, without limitation, a compressor rotor, or drive shaft 1218 and a turbine rotor, or drive shaft 1220.

In the exemplary embodiment, combustor section 1208 includes a plurality of combustor assemblies, i.e., combustors 1222 that are each coupled in flow communication with compressor section 1204. Combustor section 1208 also includes at least one fuel nozzle assembly 1224. Each combustor 1222 is in flow communication with at least one fuel nozzle assembly 1224. Moreover, in the exemplary embodiment, turbine section 1210 and compressor section 1204 are rotatably coupled to a load 1226 via drive shaft 1218. For example, load 1226 may include, without limitation, an electrical generator or a mechanical drive application, e.g., a pump. Alternatively, gas turbine engine 1200 may be an aircraft engine. In the exemplary embodiment, compressor section 1204 includes at least one compressor blade assembly 1228, i.e., blade 1228 and at least one adjacent stationary vane assembly 1230.

Also, in the exemplary embodiment, turbine section 1210 includes at least one turbine blade assembly, i.e., bucket 1232 and at least one adjacent stationary nozzle assembly 1234. Each compressor blade assembly 1228 and each turbine bucket 1232 are coupled to rotor assembly 1216, or, more specifically, compressor drive shaft 1218 and turbine drive shaft 1220.

In operation, air intake section 1202 channels air 1236 towards compressor section 1204. Compressor section 1204 compresses inlet air 1236 to higher pressures and temperatures prior to discharging compressed air 1238 towards combustor section 1208. Compressed air 1240 is channeled to fuel nozzle assembly 1224, mixed with fuel (not shown), and burned within each combustor 1222 to generate combustion gases 1242 that are channeled downstream towards turbine section 1210. Combustion gases 1242 generated within combustors 1222 are channeled downstream towards turbine section 1210. After impinging turbine bucket 1232, thermal energy is converted to mechanical rotational energy that is used to drive rotor assembly 1216. Turbine section 1210 drives compressor section 1204 and load 1226 via drive shafts 1218 and 1220, and exhaust gases 1244 are discharged through exhaust section 1214 to ambient atmosphere.

In some embodiments, gas turbine engine 1200 also includes a plurality of sensors 604 (shown in FIG. 6). The plurality of sensors 604 includes, but is not limited to, temperature sensors, accelerometers, vibration sensors and pressure sensors. These sensors 604 allow gas turbine engine 1200 to be used with measuring system 600 to monitor the dynamic system. Other dynamic systems that may be used with measuring system 600 include, but are not limited to, windmills and downhole systems. Accordingly, ones skilled in the art will be able to determine other dynamic systems with sensors that would benefit from measuring system 600.

The above-described method and system provide for highly accurate measurements of attributes of a dynamic system, while being able to account for environmental stimuli that may affect the measured attributes of the dynamic system. Furthermore, the method and systems described herein allow for accurate measurement of the environmental stimuli of the dynamic system without requiring sensors for each potential stimuli. Also, the system and methods described herein are not limited to any single predefined attribute, but may be implemented with any attribute of a dynamic system, where the attribute has at least one degree of freedom. For example, the method and systems described herein may be used with angular momentum, velocity, displacement, current, voltage, or charge. By accounting for the environmental stimuli of the dynamic system being monitored the accuracy of the measurements is greatly increased. This is accomplished by generating environmentally isolated system measurement data from received measurement data. The environmentally isolated system measurement data is generated from a Poincare map of the received measurement data. The states of the Poincare map that relate to the measured attribute are analyzed, thereby providing isolating the accurate measurement data from the environmental stimuli.

An exemplary technical effect of the methods, systems, and apparatus described herein includes at least one of: (a) generating system measurement data substantially representative of at least one measured attribute of a dynamic system using at least one measurement device; (b) extracting environmental data from the system measurement data, thereby generating corrected system measurement data; and (c) determining a corrected value for the measured attribute based on the corrected system measurement data.

Exemplary embodiments of method and systems for monitoring a dynamic system are described above in detail. The method and systems described herein are not limited to the specific embodiments described herein, but rather, components of systems or steps of the methods may be utilized independently and separately from other components or steps described herein. For example, the methods may also be used in combination with multiple sensors, and are not limited to practice with only sensors as described herein. Additionally, the methods may also be used with other measured attributes, and are not limited to practice with only the measured attributes as described herein. Rather, the exemplary embodiments may be implemented and utilized in connection with many other dynamic system monitoring applications.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for monitoring a dynamic system, said method comprising:
    generating system measurement data substantially representative of at least one measured attribute of a plurality of attributes of a dynamic system using at least one measurement device;
    generating a Poincare map based on the system measurement data, the Poincare map including representations of the plurality of attributes of the dynamic system;
    determining at least one value for a first attribute of the plurality of attributes of the dynamic system based on the generated Poincare map;

detecting a first plurality of perturbations defined by the Poincare map, wherein each of the first plurality of perturbations is defined by a first area;

determining the at least one value for the first attribute at least partially based on the first plurality of perturbations, further based on at least one of one or more coordinates of each of the first plurality of perturbations and an area of each of the first plurality of perturbations, wherein the plurality of attributes comprises at least one of angular velocity, a derivative of angular velocity, and revolutions per minute (RPM), wherein the at least one measurement device comprises at least one sensor, the at least one sensor comprising:

a package housing the at least one sensor; and at least one transducer for measuring the plurality of attributes of the dynamic system; and regulating real-time operation of the dynamic system based at least partially on the at least one determined value of the first attribute.

2. The method in accordance with claim 1, further comprising:

detecting a second plurality of perturbations defined by the Poincare map, wherein each of the second plurality of perturbations is defined by a second area, wherein the first area is greater than the second area; and determining at least one value for a second attribute of the plurality of attributes of the dynamic system at least partially based on the second plurality of perturbations, wherein the second attribute is different from the first attribute, wherein the dynamic system comprises at least one of an inertial navigation system and a downhole system.

3. The method in accordance with claim 2, further comprising determining at least one value for a third attribute of the plurality of attributes of the dynamic system at least partially based on the second plurality of perturbations, wherein the third attribute is different from the first attribute and the second attribute.

4. The method in accordance with claim 2, wherein determining at least one value for the second attribute is further based on at least one of one or more coordinates of each of the second plurality of perturbations, a shape of each of the second plurality of perturbations, and an area of each of the second plurality of perturbations.

5. The method in accordance with claim 1, wherein the at least one measurement device comprises a high-Q resonator, wherein the dynamic system comprises at least one of turbine and a windmill.

6. The method in accordance with claim 5, wherein the high-Q resonator has a Q factor of greater than 90, and wherein the high-Q resonator comprises at least one of an optical resonator and a mechanical resonator.

7. The method in accordance with claim 1, further comprising:

extracting environmental data from the system measurement data, thereby generating corrected system measurement data; and determining at least one corrected value for the first attribute at least partially based on the corrected system measurement data, wherein the at least one measurement device comprises an energy low-dissipation resonator.

8. The method in accordance with claim 1, wherein the first attribute is one of fluid temperature, pressure, current, and charge.

9. The method in accordance with claim 1, where generating a Poincare map comprises:

applying at least one force to the at least one measurement device;

measuring, by the at least one measurement device, at least one displacement of the at least one measurement device due to the at least one force;

transmitting at least one signal representative of the at least one displacement to a phase portrait analysis (PPA) computer device;

generating additional system measurement data within a predetermined period of time; and updating the Poincare map at least partially based on the additional system measurement data in real-time.

10. A sensor system for monitoring a dynamic system, said sensor system comprising:

a sensor for measuring at least one attribute of a plurality of attributes of the dynamic system; and a phase portrait analysis (PPA) computer device comprising a processor and a memory coupled to said processor, said PPA computer device in communication with said sensor, and configured to:

generate system measurement data substantially representative of at least one measured attribute of the plurality of attributes of a dynamic system using said sensor;

generate a Poincare map based on the system measurement data, the Poincare map including representations of the plurality of attributes of the dynamic system wherein the plurality of attributes affect said sensor;

determine at least one value for a first attribute of the plurality of attributes of the dynamic system based on the Poincare map;

detect a first plurality of perturbations defined by the Poincare map, wherein each of the first plurality of perturbations is defined by a first area;

determine the at least one value for the first attribute based on the first plurality of perturbations; and determine the at least one value of the first attribute based on at least one of one or more coordinates of each of the first plurality of perturbations, wherein the phase portrait analysis (PPA) computer device warns at least one user that a temperature in the dynamic system has increased and is causing variations in the at least one measurement device.

11. The sensor system in accordance with claim 10, wherein the PPA computer device is further configured to determine the at least one value of the first attribute based on the at least one of one or more coordinates of each of the first plurality of perturbations, a shape of each of the first plurality of perturbations, and an area of each of the first plurality of perturbations, wherein the at least one user determines a cause of the temperature variation and takes at least one mitigating action.

12. The sensor system in accordance with claim 10, wherein said PPA computer device is further configured to:

detect a second plurality of perturbations defined by the Poincare map, wherein each of the second plurality of perturbations is defined by a second area, wherein the first area is greater than the second area; and determine at least one value for a second attribute of the plurality of attributes of the dynamic system based on the second plurality of perturbations, wherein the second attribute is different from the first attribute, and wherein the PPA computer device further comprises at least one application specific integrated circuit (ASIC).

13. The sensor system in accordance with claim 12, wherein said PPA computer device is further configured to determine at least one value for a third attribute of the plurality of attributes of the dynamic system based on the second plurality of perturbations, wherein the third attribute is different from the first attribute and the second attribute, and wherein the PPA computer device further comprises at least one field programmable gate array (FPGA).

14. The sensor system in accordance with claim 12, wherein said PPA computer device is further configured to determine the at least one value of the second attribute at least partially based on at least one of one or more coordinates of each of the second plurality of perturbations, a shape of each of the second plurality of perturbations, and an area of each of the second plurality of perturbations, wherein the dynamic system comprises an inertial navigation system (INS), the inertial navigation system (INS) comprising at least one gyroscope and at least one accelerometer.

15. The sensor system in accordance with claim 12, wherein said PPA computer device is further configured to:
extract environmental data from the system measurement data, thereby generating corrected system measurement data; and
determine at least one corrected value for the first attribute at least partially based on the corrected system measurement data.

16. The sensor system in accordance with claim 12, wherein the sensor includes a high-Q resonator having a Q factor of greater than 90.

17. A phase portrait analysis (PPA) computer device for monitoring a dynamic system, said PPA computer device comprising:
a processor in communication with a memory and a sensor, said processor configured to:
generate system measurement data substantially representative of at least one measured attribute of a plurality of attributes of a dynamic system using at least one measurement device;
generate a Poincare map based on the system measurement data, the Poincare map including representations of the plurality of attributes of the dynamic system;
determine at least one value for a first attribute of the plurality of attributes of the dynamic system based on the generated Poincare map;
detect a first plurality of perturbations defined by the Poincare map, wherein each of the first plurality of perturbations is defined by a first area;
determine the at least one value for the first attribute at least partially based on the first plurality of perturbations, wherein the at least one measurement device comprises at least one sensor, the at least one sensor comprising:
a package housing the at least one sensor; and
at least one transducer for measuring the plurality of attributes of the dynamic system;
detect a second plurality of perturbations defined by the Poincare map, wherein each of the second plurality of perturbations is defined by a second area, wherein the first area is greater than the second area;
determine at least one value for a second attribute of the plurality of attributes of the dynamic system at least partially based on the second plurality of perturbations, wherein the second attribute is different from the first attribute, wherein the dynamic system comprises at least one of an inertial navigation system and a downhole system; and regulate real-time operation of the dynamic system based at least partially on the at least one determined value.

18. The PPA computer device in accordance with claim 17, wherein said processor is further configured to:
detect a first plurality of perturbations defined by the Poincare map; and
determine the at least one value for the first attribute based on the first plurality of perturbations.

19. The PPA computer device in accordance with claim 17, wherein the sensor includes a high-Q resonator having a Q factor of greater than 90, and
wherein the high-Q resonator comprises at least one of an electrical resonator and an acoustic resonator.

20. A method for monitoring a dynamic system, said method comprising:
generating system measurement data substantially representative of at least one measured attribute of a plurality of attributes of a dynamic system using at least one measurement device, wherein the at least one measurement device comprises a high-Q resonator, wherein the dynamic system comprises at least one of turbine and a windmill;
generating a Poincare map based on the system measurement data, the Poincare map including representations of the plurality of attributes of the dynamic system;
determining at least one value for a first attribute of the plurality of attributes of the dynamic system based on the generated Poincare map; and
regulating real-time operation of the dynamic system based at least partially on the at least one determined value of the first attribute.

21. A method for monitoring a dynamic system, said method comprising:
generating system measurement data substantially representative of at least one measured attribute of a plurality of attributes of a dynamic system using at least one measurement device;
generating a Poincare map based on the system measurement data, the Poincare map including representations of the plurality of attributes of the dynamic system;
applying at least one force to the at least one measurement device;
measuring, by the at least one measurement device, at least one displacement of the at least one measurement device due to the at least one force;
transmitting at least one signal representative of the at least one displacement to a phase portrait analysis (PPA) computer device;
generating additional system measurement data within a predetermined period of time;
updating the Poincare map at least partially based on the additional system measurement data in real-time;
determining at least one value for a first attribute of the plurality of attributes of the dynamic system based on the generated Poincare map; and
regulating real-time operation of the dynamic system based at least partially on the at least one determined value of the first attribute.

22. A sensor system for monitoring a dynamic system, said sensor system comprising:
a sensor for measuring at least one attribute of a plurality of attributes of the dynamic system; and
a phase portrait analysis (PPA) computer device comprising a processor and a memory coupled to said processor, said PPA computer device in communication with said sensor, and configured to:

generate system measurement data substantially representative of at least one measured attribute of the plurality of attributes of a dynamic system using said sensor;

generate a Poincare map based on the system measurement data, the Poincare map including representations of the plurality of attributes of the dynamic system wherein the plurality of attributes affect said sensor;

determine at least one value for a first attribute of the plurality of attributes of the dynamic system based on the Poincare map;

determine the at least one value for the first attribute at least partially based on the first plurality of perturbations;

detect a second plurality of perturbations defined by the Poincare map, wherein each of the second plurality of perturbations is defined by a second area, wherein the first area is greater than the second area;

determine at least one value for a second attribute of the plurality of attributes of the dynamic system based on the second plurality of perturbations, wherein the second attribute is different from the first attribute, and wherein the PPA computer device further comprises at least one application specific integrated circuit (ASIC); and determine at least one value for a third attribute of the plurality of attributes of the dynamic system based on the second plurality of perturbations, wherein the third attribute is different from the first attribute and the second attribute, and wherein the PPA computer device further comprises at least one field programmable gate array (FPGA).

\* \* \* \* \*